United States Patent
Harper

(10) Patent No.: US 9,832,140 B2
(45) Date of Patent: Nov. 28, 2017

(54) SYSTEM AND METHOD FOR CHARACTERIZING NETWORK TRAFFIC

(71) Applicant: Saisei Networks, Inc., Sunnyvale, CA (US)

(72) Inventor: John Anthony Harper, Mountain View, CA (US)

(73) Assignee: Saisei Networks, Pte Ltd., Sunnyvale, CA (US)

( * ) Notice: Subject to any disclaimer, the term of this patent is extended or adjusted under 35 U.S.C. 154(b) by 341 days.

(21) Appl. No.: 14/627,996

(22) Filed: Feb. 20, 2015

(65) Prior Publication Data

US 2016/0248700 A1    Aug. 25, 2016

(51) Int. Cl.
*H04L 12/927* (2013.01)
*H04L 12/26* (2006.01)
*H04L 12/24* (2006.01)

(52) U.S. Cl.
CPC .......... *H04L 47/805* (2013.01); *H04L 41/14* (2013.01); *H04L 43/028* (2013.01); *H04L 47/801* (2013.01); *H04L 43/062* (2013.01)

(58) Field of Classification Search
CPC ..... H04L 41/14; H04L 43/028; H04L 43/062; H04L 47/801; H04L 47/805
See application file for complete search history.

(56) References Cited

U.S. PATENT DOCUMENTS

| | | | | |
|---|---|---|---|---|
| 7,050,445 | B1* | 5/2006 | Zellner | H04L 12/5695 370/233 |
| 2007/0039049 | A1* | 2/2007 | Kupferman | G06F 11/3495 726/22 |
| 2011/0314145 | A1* | 12/2011 | Raleigh | H04L 41/0893 709/224 |
| 2014/0053265 | A1* | 2/2014 | Crowley | H04L 43/12 726/22 |
| 2014/0126502 | A1* | 5/2014 | Westberg | H04W 72/1247 370/329 |
| 2014/0280822 | A1* | 9/2014 | Chennimalai Sankaran | H04L 41/5022 709/223 |
| 2014/0280829 | A1* | 9/2014 | Kjendal | H04L 43/028 709/223 |
| 2015/0295808 | A1* | 10/2015 | O'Malley | H04L 47/22 709/224 |
| 2016/0094480 | A1* | 3/2016 | Kulkarni | H04L 47/805 370/230 |

* cited by examiner

*Primary Examiner* — Joe Chacko
(74) *Attorney, Agent, or Firm* — David R. Stevens; Stevens Law Group

(57) ABSTRACT

A system monitors first traffic and identifies associations between applications that generated or received the traffic and parameters such as domain names, a remote host, and a local host referenced in the traffic. Subsequent traffic is monitored and determined to be generated by or addressed to an application according to such parameters in the subsequent traffic, such as remote host, local host, domain name, or port number. The subsequent traffic is associated with an application without requiring deep packet inspection (DPI). In particular, an application may be associated with a session based on evaluation of a single packet of the session.

3 Claims, 4 Drawing Sheets

SYSTEM AND METHOD FOR CHARACTERIZING NETWORK TRAFFIC

BACKGROUND

Traffic monitoring and management systems attempt to recognize applications by analyzing the content of traffic flows. This is referred to as Deep Packet Inspection (DPI). However there are several problems with DPI. DPI cannot interpret the content of encrypted packets. Currently over 30% of Internet traffic is encrypted, and this is increasing. DPI further cannot identify the application until some traffic has flowed. Even in the best case this means that the first few packets cannot be associated with an application. Finally, there are many applications, often the ones of most interest (such as peer-to-peer protocols, which consume large amounts of bandwidth), that require tens of packets before they can be identified. Hence in practice it is not possible to rely on DPI to identify all traffic. The systems and methods disclosed herein provide an improved approach for recognizing applications in network traffic.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
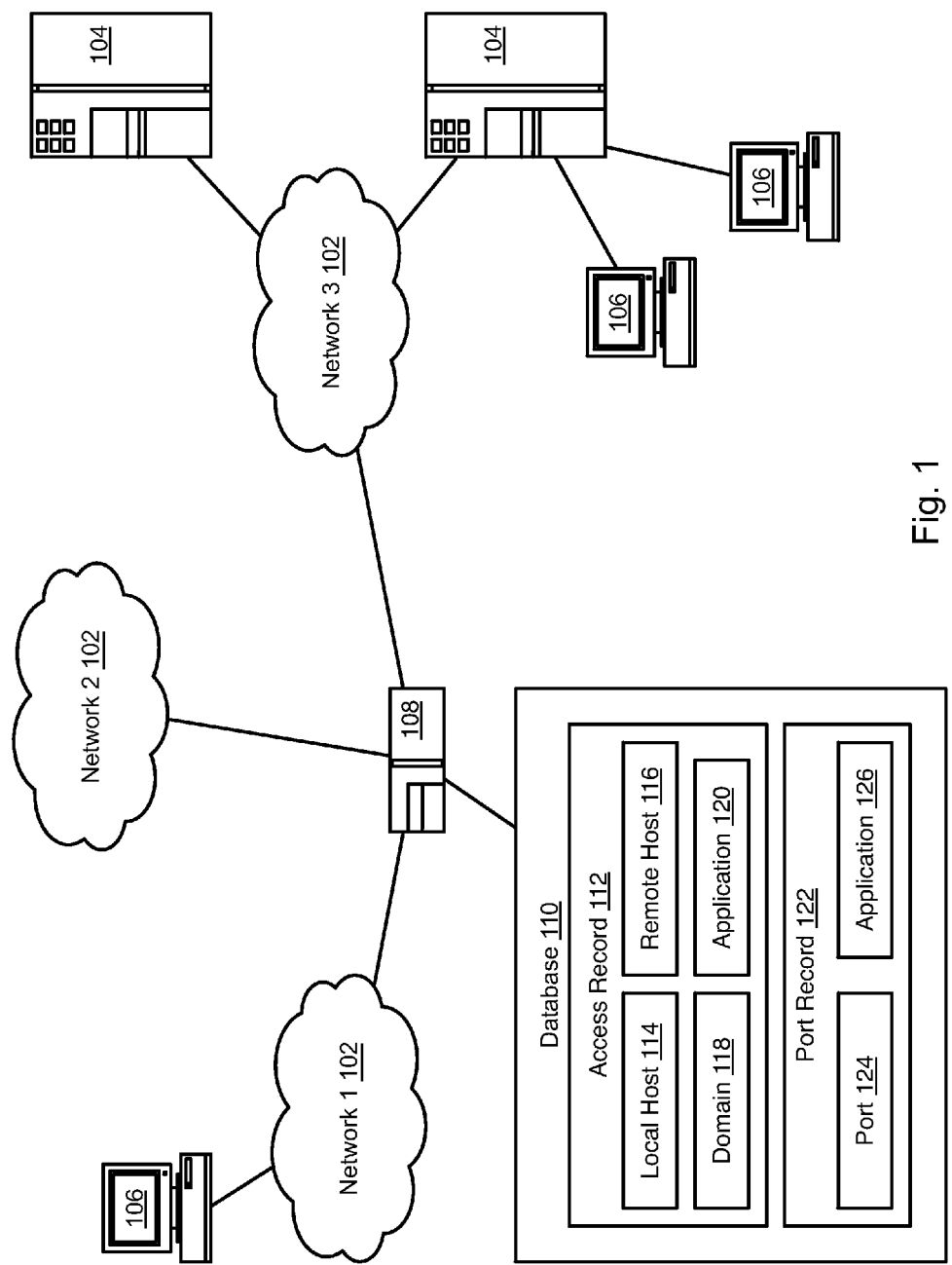
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shower, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, personal video recorder (PVR), a digital media [e.g. compact disc (CD), digital video disc (DVD), MP3, etc.] player, printer, and/or any other type of logic.

In order to facilitate communication among the networks 102, at least one network device 108 is coupled between the networks 102. In the context of the present description, such network device 108 may include any hardware and/or software capable of facilitating the communication of packets from one point in the network architecture 100 to another. For example, the network device 108 may include a router, a flow manager, and/or any other network device that meets the above definition, for that matter. More information regarding various features for enhancing such functionality will be set forth hereinafter in greater detail.

The network device 108 may implement any of the systems methods disclosed in U.S. Pat. No. 8,509,074, which is hereby incorporated herein in its entirety for all purposes. In particular the network device 108 may control the rate of network flow between networks 102 such as between an internal network 102 and an external network 102. The network device 108 may further implement the systems and methods disclosed in U.S. Pat. No. 8,547,843, which is likewise incorporated herein in its entirety for all purposes. For example, the network device 108 may control utilization of ports as described in U.S. Pat. No. 8,547,843.

The network device 108 may generate and utilize the data of a database 110 according to methods described herein. In particular access records 112 recording one or more attributes of sessions represented in network traffic analyzed by the network device 108. For example, network traffic may be analyzed to determine a local host 114 (e.g. local to an internal network 102) and remote host 116 references in network packets of a session and these values stored in an access record 112 for that session access record 112 may further include a domain 118 (e.g. domain name service (DNS) domain or other uniform resource locator (URL) referenced by the network traffic of the session. As described in greater detail herein, an application the one or both of is addressed by the network traffic of the session and generated the network traffic of the session may advantageously be determined. Where this has occurred, an identifier 120 of the application identified may be included in the access record 112 for the session.

In some embodiments, the database 110 may include port records 122 mapping ports 124 to particular applications 126. For example, specific applications may communicate over specific ports and the mapping of a particular application to a particular port may be published or otherwise known. For example, IANA (Internet Assigned Number Authority) maintains a table of mappings of applications to specific ports. Accordingly, the port records 122 may be embodied as the entries of the IANA table. The port records 122 may be periodically updated to reflect current mappings.

Figure 2:
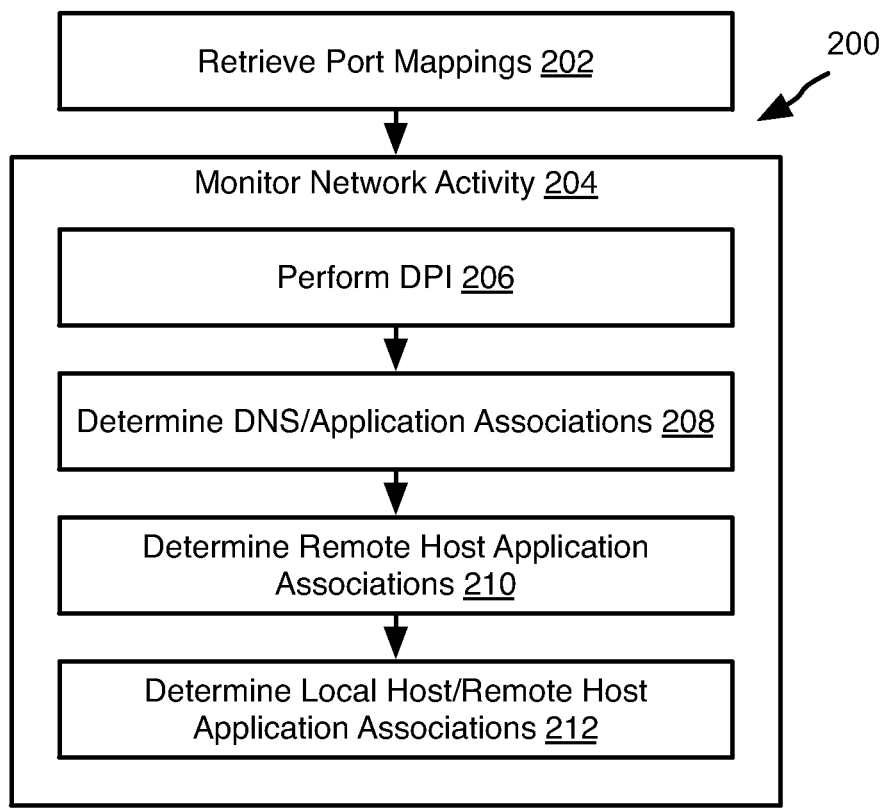
FIG. 2 is a process flow diagram of a method for gathering application data from network traffic in accordance with an embodiment of the present invention.

FIG. 2 illustrates a method 200 for collecting data of a database 110 for use according to the methods described herein. The illustrated method 200 may be performed by the network device 108 for some other computing device that updates the database 110 for use by the network device 108.

The method 200 may include retrieving 202 port mappings between port numbers and applications, such as from a computer system operated by IANA. The method 200 may further include monitoring 204 network activity. In particular, monitoring 204 network activity may include receiving packets of data routed through the network device 108 between internal and external networks 102. Monitoring 204 may include performing some or all of steps 206-212 with respect to the packets of network traffic evaluated. In particular, for the packets of a particular session steps 206-212 may be performed to populate an access record 112.

For example, the method 200 may include performing 206 DPI with respect to the packets of a session. Performing 206 DPI may include performing any conventional approach to DPI and for identifying the application that is generating or receiving the packets. DPI may extract some or all of the data of an access record 112 noted above, including the local host, remote host, domain name, and application references in the packets for a particular session. Performing 206 DPI may be accompanied by or replaced with other techniques such as usage heuristics, analysis of unencrypted data imprints from DNS requests, or other techniques. For purposes of this disclosure, references to DPI may include any technique for analyzing network traffic and obtaining an association to an application.

The method 200 may include determining 208 an association between a particular domain (e.g. DNS domain) and an application, such as from the data obtained by DPI or some other means. In particular, where packets referencing a domain are determined to be associated with a particular application by DPI or some other means, then an access record 112 may be created that indicates that packets referencing that domain are likely associated with that application. The access record 112 may indicate a degree of confidence of the association that is a function of a number of sessions or packets that are determined to be associated with the application and that reference the domain.

The domain associated with a session may be determined based on a prior DNS request detected by the network device and a DNS response that includes an IP address for the domain included in the DNS request. A subsequent session or packet including that IP address may therefore be inferred to reference the domain of the DNS request. A single remote host may host many applications, so the DNS information may be stored separately for each local host. That is to say, the access records 112 for a particular local host may record domain-to-application associations that are used to determine applications for subsequent traffic from that local host.

The method 200 may include determining 210 associations between remote hosts and applications. For example, if DPI or some other analysis techniques reveals that one or more sessions with a particular remote hosts include data addressed to or generated by a particular application, then an access record 112 may be generated that indicates that sessions referencing that remote host are likely to be associated with that application. The access record may include a value indicating the degree of confidence of the association, such as the number of session or packets that both reference the remote host and are generated by or addressed to the application.

The method 200 may include determining 212 associations between a local host, a remote host, and an application. For example, if DPI or some other analysis techniques reveals that one or more sessions involving a connection between a local host and a remote host include data addressed to or generated by a particular application, then an access record 112 may be generated that indicates that sessions referencing that local host and remote host are likely to be associated with that application. The access record 112 may include a value indicating the degree of confidence of the association, such as the number of session or packets that both reference that local host and remote host and are generated by or addressed to the application.

Figure 3:
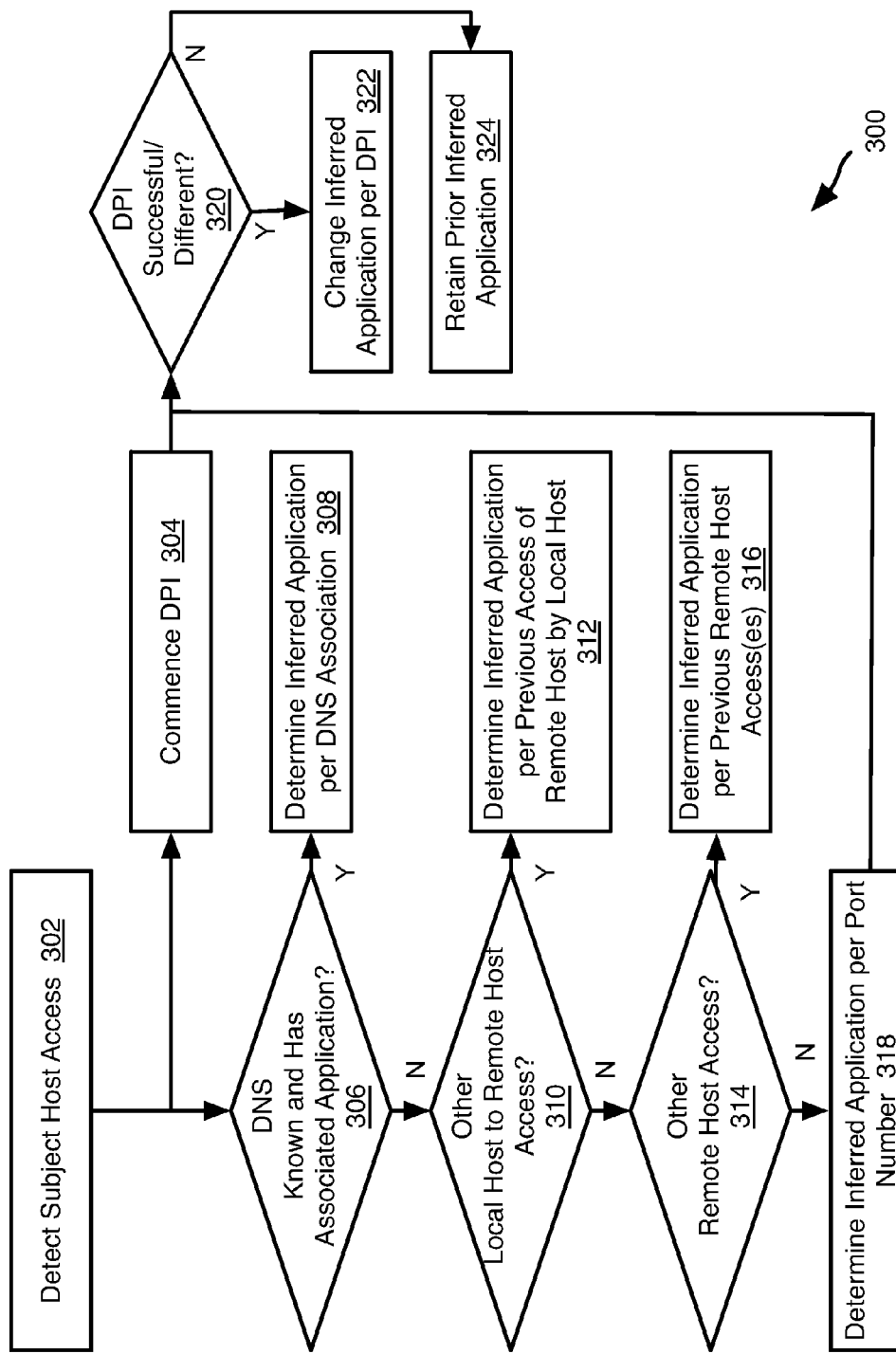
FIG. 3 is a process flow diagram for characterizing traffic in accordance with an embodiment of the present invention.

FIG. 3 illustrates a method 300 that may be performed by the network device 108 with respect to network traffic in order to determine the application that generated or is the addressee of the traffic. The method 300 advantageously does not require DPI and can be performed by analyzing less than tens of packets, e.g. less than 10 packets or only one packet. The method 300 likewise does not require decryption of payload data of a packet.

The method 300 may be performed subsequent to performing of the method 200 of FIG. 2 with respect to subsequent network traffic from that analyzed according to the method 200. Specifically, the data used to perform the method 300 may be obtained by prior execution of the method 200, though the method 200 may be performed concurrently with the method 300 in order to obtain more current data. Alternatively or additionally, the method 200 may be performed with respect to traffic that is not encrypted and for which DPI or some other analysis may be performed to determine the application associated with the traffic. The method 300 may be performed with respect to encrypted data for which DPI or other analysis techniques are not available.

The method 300 may include detecting 302 accessing by a local host (hereinafter the "subject host") of a remote host. Detecting 302 may include receiving a packet by the network device 108 and analyzing the packet to identify the subject host and the remote host addressed by the packet.

The method 30 may include commencing 304 performing of DPI 304. As noted above, DPI may require evaluation of many packets. Accordingly, commencing DPI 304 and the continued performance of DPI may be performed in parallel with or after the subsequent steps 306-318 of the method 300. As described in greater detail below, the application may be accurately inferred from a single packet without performing DPI.

The method 300 may include determining 306 whether an access record 112 exists that includes a domain 118 identical to or similar to a domain indicated in the detected 302 access and that includes an application identifier 120 determined to be associated with that domain. If so, then the method 300 may include determining 308 the inferred application to be that referenced by the application identifier 120 of this access record. As noted above, a single domain may host multiple applications. Accordingly, an access record 112 listing the subject host and an association between a domain 118 and an application identifier 120 may be used to determine 308 the application.

If a domain-to-application association is not found 306, the method 300 may include determining 310 an application association was determined for a previous access by the subject host to the remote host referenced in the detected 302 access. If so, then the method 306 may include determining 312 an application associated with the detected 302 access according to that association. For example, an access record 112 listing the subject host 114 and remote host 116 referenced in the detected 302 access may be identified and the application 120 thereof identified as the inferred application associated with the detected 302 access.

If no access record 112 having an application association is found 312 that also references the subject host and the remote host, then the method 300 may include determining 314 whether another access record 112 exists that at least references the same remote host and has an application association. If so, then the inferred application for the detected 302 access is determined 316 from this access record 112. In particular, the application 120 identified in this access record 112 may be determined 316 to be the inferred application for the detected 302 access.

In some instances, multiple access records 112 listing the same remote host as the detected 302 access may reference multiple applications. Accordingly, the inferred 314 application may be an application that is referenced significantly more (e.g. some threshold amount more) than other applications in such access records 112. If multiple applications are referenced in the access records 112 referencing a remote host and no one application is referenced in such access records a threshold amount more than any other, then the method 300 may proceed to step 318 rather than inferring an application based on such access records.

If no access record is determined 318 to be associate with the remote host for the detected 302 access, the method 300 may include determining 318 the inferred application as the application mapped to a port number referenced in the detected 302 access, such as according to the IANA port mapping.

Once the application associated with the detected 302 access is determined various actions may be taken. For example, some applications such as peer-to-peer sharing services may consume large amounts of bandwidth and interfere with more legitimate activities. Accordingly, packets determined to generated by or addressed to a peer-to-peer sharing application may be given a lower priority than other applications in order to ensure a desired quality of service to other customers.

In another example use, the internal network 102 is a corporate network. Traffic for applications that are important to the business activity of the corporate network may be given higher priority than other applications that might be for personal use (e.g. access to cloud-based enterprise applications will be given higher priority than web browsing, FACEBOOK access, or other entertainment-oriented applications). Alternatively, traffic directed to non-business use may be discarded altogether in order to avoid wasting bandwidth.

Any other method known in the art for prioritizing or blocking traffic may be used with the selection of priority or whether to block being made based on the application associated with the traffic as determined according to the methods disclosed herein. For example, the methods of U.S. Pat. No. 8,509,074 and U.S. Pat. No. 8,547,843 may be performed with respect to traffic using application data for the traffic obtained as described herein.

As noted above, DPI may take longer and require the evaluation of more packets then some or all of steps 306-318. Accordingly, if DPI ends and is found 320 to have been successful and determined a different application to be associated with the detected 302 access, then the method 300 may change 322 the inferred application to that determined by DPI. If DPI is not successful or determines the inferred application to be the same as that determined according to some or all of steps 306-318, then the inferred application 324 is retained an no change is made.

If the inferred application is changed 322, then any actions taken based on the inferred application may also be changed. For example, the priority assigned to the session may be raised or lowered if the DPI-determined application has higher or lower priority, respectively, than that determined according to some or all of steps 306-318.

Figure 4:
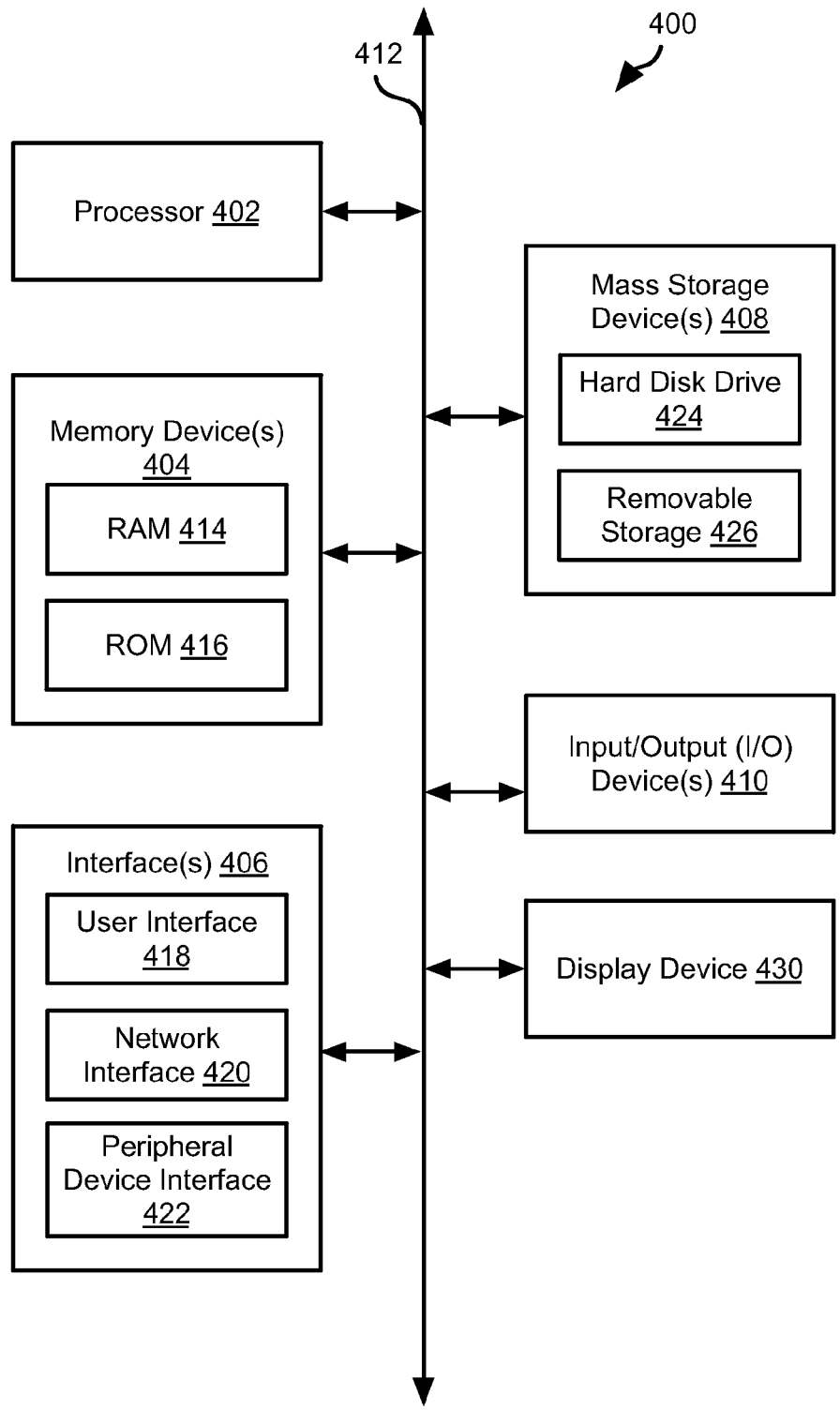
FIG. 4 is a schematic block diagram of a computer system suitable for implementing methods in accordance with embodiments of the present invention.

FIG. 4 is a block diagram illustrating an example computing device 400 which may implement any of the servers 104, client computers 106, or the network device 108. Computing device 400 may be used to perform various procedures, such as those discussed herein. Computing device 400 can function as a server, a client, or any other computing entity. Computing device can perform various monitoring functions as discussed herein, and can execute one or more application programs, such as the application programs described herein. Computing device 400 can be any of a wide variety of computing devices, such as a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A system comprising one or more processors and one or more memory devices coupled to the one or more processors, the one or more memory devices storing executable and operational code effective to cause the one or more processors to:

evaluate first traffic to identify for each first session of a portion of first sessions in which the first traffic occurs and, according to the evaluation, identify a local host associated with the each first session, a remote host associated with the each first session, and an application of a plurality of applications associated with the each first session;

evaluate second traffic subsequent to the first traffic; and for each second session of a plurality of second sessions in the second traffic— identify a local host and a remote host associated with the each second session;

identify an inferred application of the plurality of applications that is associated with a same local host and a same remote host in one or more of the first sessions as the each second session; and apply prioritization logic to subsequent traffic in the each second session according to the associating of the inferred application to the each second session;

wherein the executable and operational code effective to cause the one or more processors to identify the inferred application of the plurality of applications for the each second session by— if (a) one or more first sessions of the portion of the first sessions are associated with a same domain name as the each second session, identifying as the inferred application, the application associated with the one or more first sessions of the portion of the first sessions associated with the same domain name as the each second session;

if not (a), then if (b) one or more first sessions of the portion of the first sessions are associated with the same remote host and the same local host as the each second session, identifying as the inferred application, the application associated with the one or more first sessions of the portion of the first sessions including the same remote host and the same remote host as the each second session; and if not (b), then if one or more first sessions of the portion of the first sessions are associated with the same remote host as the each second session, identifying as the inferred application, the application associated with the one or more first sessions of the portion of the first sessions including the same remote host as the each second session.

2. The system of claim 1, wherein the executable and operational code effective to cause the one or more processors to identify the inferred application of the plurality of applications for the each second session by:
   if not (c), selecting the inferred application as an application that is mapped to a port associated with the each second session in a mapping database.

3. The system of claim 2, wherein the executable and operational code effective to cause the one or more processors to identify the inferred application of the plurality of applications for the each second session by:
   attempting to perform deep packet inspection (DPI) for the each second session; and
   if DPI for the each second session is successful, selecting as the inferred application an application determined according to DPI.

\* \* \* \* \*

UNITED STATES PATENT AND TRADEMARK OFFICE
CERTIFICATE OF CORRECTION

| | |
|---|---|
| PATENT NO. | : 9,832,140 B2 |
| APPLICATION NO. | : 14/627996 |
| DATED | : November 28, 2017 |
| INVENTOR(S) | : John Anthony Harper |

It is certified that error appears in the above-identified patent and that said Letters Patent is hereby corrected as shown below:

In the Claims

Column 8, Claim 1, Line 65 should read:
if not (b), then if (c) one or more first sessions of the portion of the first sessions are
associated with the same remote host as the each second session, identifying as the inferred
application, the application associated with the one or more first sessions of the portion of the first
sessions including the same remote host as the each second session.

Signed and Sealed this
Thirtieth Day of October, 2018

Andrei Iancu
*Director of the United States Patent and Trademark Office*